Feb. 13, 1951 E. T. JAYNES 2,541,067

FREQUENCY RESPONSIVE DEVICE

Filed Nov. 30, 1944

INVENTOR
EDWIN T. JAYNES
BY Paul B. Hunter
ATTORNEY

Patented Feb. 13, 1951

2,541,067

UNITED STATES PATENT OFFICE 2,541,067

FREQUENCY RESPONSIVE DEVICE

Edwin T. Jaynes, Garden City, N. Y., assignor to The Sperry Corporation, a corporation of Delaware Application November 30, 1944, Serial No. 565,966

5 Claims. (Cl. 175—368)

The present invention relates to methods and apparatus for determining the frequency of an alternating signal.

A principal object of this invention is to provide an improved frequency meter.

Another object of this invention is to provide an improved method of frequency measurement.

Another object is to provide an improved direct-reading instrument for indicating the frequency of an applied input signal, independently of the signal amplitude.

It is another object of this invention to provide a frequency meter capable of simultaneously indicating a plurality of frequency components of applied signal voltage.

A further object of this invention is to provide a method of and apparatus for indicating the ratio of the component of a signal passed by a high-pass filter to the component of the signal passed by a low-pass filter.

Another object is to provide a frequency meter employing a cathode-ray indicator for producing an indicating trace angularly movable according to the frequency of an impressed signal.

Yet another object is to provide a frequency meter employing a low-pass filter and a high-pass filter arranged to provide output signals of fixed phase relation and of varying differential amplitude according to the frequency of an impressed signal.

A further object is to provide frequency-responsive apparatus employing both a low-pass filter and a high-pass filter responsive to an input signal for providing output signals of fixed phase relation but of amplitude ratio varying according to the frequency of the input signal.

Yet another object is to provide frequency-responsive apparatus having a low-pass filter and a high-pass filter both responsive to an input signal for impressing upon a signal ratio responsive device two output signals of ratio varying according to the frequency of the input signal.

A still further object is to provide frequency-responsive apparatus having a low-pass filter and a high-pass filter, both responsive to an input signal for impressing upon a signal ratio indicator or other responsive device two output signals of amplitude ratio dependent on the frequency of the input signal, the low-pass filter and the high-pass filter being of such correlated design characteristics as to provide output signals of fixed phase relation independent of signal frequency.

Other and further objects and advantages will become apparent as the description proceeds.

In accordance with the invention in its preferred form, two frequency-responsive filters or transmission networks having different frequency response characteristics are adapted to receive a common input signal and to provide two output signals for amplitude comparison. These output signals are applied to an amplitude or strength comparator responsive to the relative amplitudes of the signals passed through the two frequency-responsive filters for indicating the frequency of the common input signal. In order to provide differentially varying frequency-output characteristics, one frequency-responsive filter may be adapted to provide an output signal of amplitude increasing with the increasing frequency of an applied signal, while the other filter may be arranged to produce an output signal decreasing with the increasing frequency of the applied input signal. The relative strengths of the signal components transmitted through the networks, e. g., the ratio of the output amplitudes of the two filter networks, may be taken as a measure of the frequency of the applied input signal.

In a preferred embodiment of the present invention, a cathode-ray oscilloscope is employed as an indicator of the relative strength of signal components transmitted through the differential attenuation networks or the high-pass and low-pass filters. The oscilloscope produces a visible trace angularly movable according to the amplitude ratio of signals applied to the respective deflecting circuits thereof. If two sinusoidal alternating voltages are applied to the respective "horizontal" and "vertical" deflection circuits of a cathode-ray oscilloscope, e. g., to the appropriate deflection plates of an electrostatic deflection oscilloscope, and if such voltages are maintained in phase or 180° out of phase, a single visible line will be produced upon the fluorescent viewing screen of the oscilloscope at an angle or orientation dependent upon the relative amplitudes of the "vertical" deflection signal and the "horizontal" deflection signal. The viewing screen of the cathode-ray tube may then be provided with a calibration scale suitable for indicating directly the amplitude ratio of the applied signals, and such a scale may be calibrated in terms of frequency of signals applied to the cathode-ray deflection circuits through a specific pair of filters in a manner to be described.

In accordance with the present invention, a low-pass filter or transmission network and a high-pass filter or transmission network may be provided with their input circuits connected to a pair of common signal input terminals and their output circuits connected respectively to the "horizontal" deflection circuit and the "vertical" deflection circuit of the cathode-ray oscilloscope employed as a relative strength indicating device. The two filters may be especially designed with a particular correlation of filter network component values to provide output voltages of fixed relative phase displacement, so that the pattern produced on the fluorescent screen of the oscilloscope by the application of a sinusoidal input signal to the above-mentioned common input terminals may be maintained in the form of a single visible line as indicated above.

In order to provide oppositely sloping frequency-responsive characteristics and to maintain the desired fixed output phase relation, the high-pass and low-pass filters may comprise resistance-reactance networks of such correlated design as to provide output phase shifts differing by 180° irrespective of input frequency. Accordingly, the image presented on the cathode-ray tube viewing screen is maintained in the form of a straight line.

If a plurality of frequency components are present in the signal applied to the above apparatus, the image presented on the screen of the cathode-ray tube appears as an illuminated area bounded by a polygon having one pair of parallel sides resulting from each component frequency. The slope of each such pair of sides is indicative of the frequency of the corresponding component of the applied input signal.

A better understanding of the invention will be afforded by the following detailed description considered in conjunction with the accompanying drawing, in which.

Like reference characters are utilized throughout the drawing to designate like parts thereof.

Figure 1:
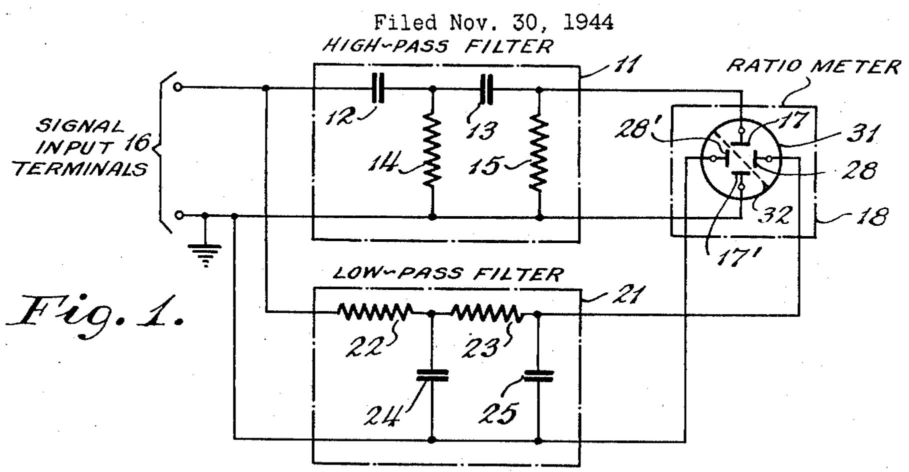
Fig. 1 is a circuit diagram of a frequency-measuring apparatus in accordance with the present invention.

Referring now to Fig. 1, a high-pass filter or transmission network 11 is shown comprising series capacitors 12 and 13 and shunt resistors 14 and 15. The input circuit of the high-pass filter 11 is connected to a pair of signal input terminals 16, while the output circuit of the filter 11 is connected to the vertical deflection plates 17, 17' of a cathode-ray tube 31 employed as a ratio meter 18.

A low-pass filter or transmission network 21 comprising series resistors 22 and 23 and shunt capacitors 24 and 25 is also provided with input connections to the common signal input terminals 16. The output circuit of the low-pass filter 21 is connected to the horizontal deflection plates 28 and 28' of the cathode-ray tube 31 of the oscilloscope ratio indicating instrument 18.

In order that the output signal components provided by the low-pass filter 21 and the high-pass filter 11 may be maintained in phase opposition or 180° relative phase displacement, the product of the resistance and the capacitance values of resistor 14 and capacitor 12 may be made equal to the product of the values of resistor 22 and capacitor 24, and the product of resistance 15 and capacitance 13 may be made equal to the product of resistance 23 and capacitance 25. Then the output signals from the high-pass filter 11 and the low-pass filter 21 will be maintained at 180° relative phase displacement.

If the frequency of the alternating input signal applied to terminals 16 is such as to produce equal amplitude output signals from the high-pass filter 11 and the low-pass filter 21, and if these equal amplitude signals are applied to a cathode-ray tube 31 having equal "horizontal" and "vertical" deflection sensitivities, the resultant visible trace produced on the fluorescent viewing screen of the cathode-ray oscilloscope 18 will be seen as a diagonal line oriented as indicated by the line 32 seen passing through the center of the cathode-ray tube screen in Fig. 1 at a 45° angle with respect to the axes of deflection of the oscilloscope. If the frequency of the signal applied to the input terminal 16 is appreciably higher than that frequency for which low-pass filter 21 and high-pass filter 11 provide equal output amplitudes, the straight-line trace 32 on the fluorescent screen will shift to a more nearly vertical position across the fluorescent viewing screen of the cathode-ray oscilloscope 18; while for a very low-frequency input signal applied to the input terminals 16, the trace 32 becomes more nearly horizontal.

Figure 2:
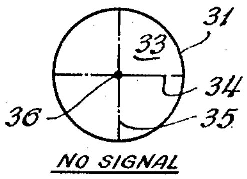
Figs. 2, 3 and 4 are views of the fluorescent screen of the cathode-ray oscilloscope of Fig. 1, respectively representing conditions of no applied input signal, a low-frequency input signal, and a high-frequency applied input signal.
Figure 3:
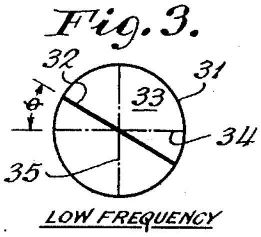
Figure 4:
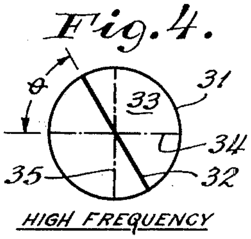

The operation of the frequency-responsive apparatus of Fig. 1 is illustrated in Figs. 2, 3 and 4, in each of which is shown the cathode-ray tube 31 having a fluorescent viewing screen 33 and "horizontal" and "vertical" deflection axes 34 and 35, respectively. When no input signal is applied to the input terminals 16, and accordingly, no alternating voltage is applied to either deflection circuit of the oscilloscope, the visible pattern produced on the fluorescent screen 33 is reduced to a single dot 36 centered upon the circular viewing area provided on the cathode-ray tube 31.

When a low-frequency signal is applied to the input terminals 16, a visible trace 32 is produced at a relatively small angle $\theta$ from the horizontal axis 34, as shown in Fig. 3. This is explained by the fact that the high-pass filter or network 11 provides relatively high attenuation or poor transmission of a low-frequency signal, thus applying a relatively small output component to the "vertical" deflection circuit of the cathode-ray oscilloscope 18. The low-pass filter or network 21, on the other hand, having relatively low attenuation for the low-frequency signal, applies a strong output component to the "horizontal" deflection plates 28, 28', so that the electron beam is made to trace a line having a large "horizontal" component but a relatively small "vertical" component.

With a relatively high-frequency input signal applied to the common signal input terminals 16, the transmissivity of network 11 is greatly increased relative to the transmissivity of network 21, so that the indicating line or trace 32 becomes nearly vertical, with a relatively large displacement angle θ above horizontal, in accordance with the above-described operating principles of the frequency-measuring apparatus.

If a plurality of frequency components are present in the signal applied to the input terminals 16, e. g., a pair of components at 80 cycles per second and 91 cycles per second, respectively, a luminous area is produced on the screen 33. This luminous area is bounded by a polygon comprising a number of pairs of parallel lines equal to the number of frequency components present. In the above example, there is produced a luminous area having a parallelogram-shaped boundary, two parallel sides of which lie at the inclination on the screen 33 corresponding to the 80-cycle frequency, while the other two sides lie at the inclination on screen 33 corresponding to 91 cycles per second.

The frequency indications provided by the frequency-responsive apparatus of the present invention may be studied directly or may be photographed to record the component frequencies of a complex signal voltage applied to its input terminals. Such adaptability for simultaneous measurement of frequency components of a signal renders the present invention especially well suited for analysis of sound waves. This invention is also especially suited for indicating simultaneously a plurality of frequencies derived by a radio altimeter or a radio detection system of the type producing relatively low beat frequencies due to the Doppler frequency change effect accompanying movement of detected objects.

Furthermore, the length of the lines comprising the bounding polygon of the luminous pattern are useful in the above discussed applications for indicating the relative strengths of the frequency components present in the input signal.

Figure 5:
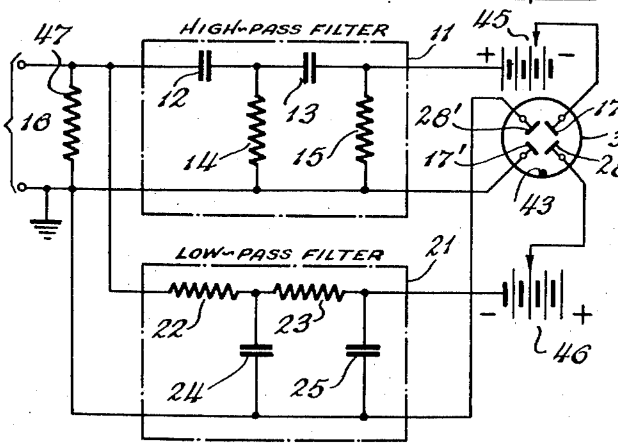
Fig. 5 is a circuit diagram of a modified form of the present invention, wherein the cathode-ray tube of the oscilloscope has been rotated through a 45° angle, and biasing voltages have been applied, for producing a somewhat modified output indication simulating the pointer movement of a galvanometer.

In a modified form of the present invention illustrated in Fig. 5, the cathode-ray tube 31 may be rotated in a clockwise direction through an angle of 45°, and direct voltage bias may be inserted in the circuit of each set of deflection plates, in order to fix the position of the visible dot produced in the absence of an input signal at a point near the bottom of the cathode-ray tube screen.

As shown in Fig. 5, an adjustable direct voltage bias source 45 may be connected in series with the circuit connected to the "vertical" deflection plates 17 and 17'. Similarly, an adjustable bias source 46 may be connected in series with the "horizontal" deflection circuit. In order to complete the bias circuit for the potential source 46, a relatively high-impedance element such as a resistor 47 may be connected between the input terminals 16. The bias sources 45 and 46 may be so polarized and so adjusted as to provide sufficient potential for biasing the "no signal" position of the dot 36 to a point 43 in the vicinity of the bottom of screen 33 of the angularly displaced cathode-ray tube 31.

Figure 6:
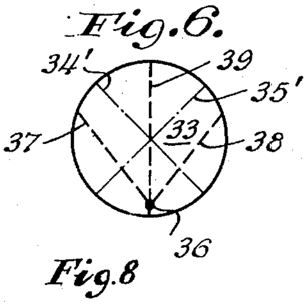
Fig. 6 is a view of the cathode-ray tube screen of Fig. 5, showing the indication produced with the circuit arrangement of the latter figure.

With the arrangement illustrated in Fig. 5, the application of a very low-frequency input signal to the input terminals 16 produces an indication on the screen 33 positioned as indicated by dotted line 37 in Fig. 6. A high-frequency signal applied to the input terminals 15 produces an indication positioned on the screen 33 as illustrated in Fig. 6 by the dotted line 38, while a signal of an intermediate frequency value produces a substantially vertical indicating line positioned as shown by dotted line 39. It should be noted that the line 37 is nearly parallel to the shifted "horizontal" axis 34', while the line 38 is nearly parallel to the shifted "vertical" axis 35'.

Figure 7:
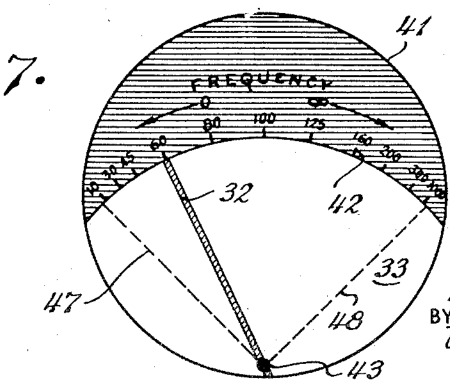
Fig. 7 is a view of the cathode-ray screen of the frequency measuring apparatus of Fig. 5, equipped with a crescent-shaped mask calibrated for use as a frequency-indicating instrument.

If desired, an opaque crescent-shaped mask 41 may be provided for covering the upper portion of the fluorescent screen 33, as shown in Fig. 7. This opaque mask, preferably of non-magnetic and non-conductive material, may be provided with a frequency calibration scale 42, so that the angular deflection of the indicating line 32 may be readily interpreted in terms of signal frequency. With a frequency calibration scale 42 positioned along the lower arcuate border of the mask 41, and with this arcuate border centered about the fixed-bias displaced pivotal point 43 of the indicating line 32, the cathode-ray oscilloscope may be made to resemble very closely a typical galvanometer, and to make efficient use of the circular screen area for a relatively extensive calibration scale.

As shown in Fig. 7, the indicating line may be deflected through an angular range of ninety degrees, as between the extremes shown by dotted lines 47 and 48, in a conventional cathode-ray oscilloscope having mutually perpendicular deflection axes. The indicating line 32 may be deflected through an angle approaching the maximum deflection range for a relative frequency change of the order of 100 to 1, as illustrated by the positions of the 10-cycle and 1000-cycle calibration points shown by way of an example in Fig. 7.

From the above description of my invention, it is apparent that a frequency-responsive apparatus such as a frequency meter is produced by the combination of a pair of frequency-responsive filters or transmission networks sensitive to a common input signal source for providing two output signals differentially varying in strength according to frequency of the input signal, with a device responsive to the relative strength of the output signals to be actuated in accordance with the frequency of the common input signal.

If a cathode-ray oscilloscope is used as the relative strength responsive device, with one network output signal applied to each of two deflection circuits of the oscilloscope, the networks may be so correlated in design—i. e., the components of the networks may be of such values and such circuit arrangements—as to produce a fixed phase relation between the outputs of the two networks for any frequency within the desired range of measurement. Preferably, this phase displacement is maintained at either 0° or 180°.

When the deflection circuits of a cathode-ray oscilloscope are supplied cophasally with the two components of a common, sinusoidal input signal transmitted through the two networks, the fluorescent screen of the oscilloscope provides a visible straight-line image whose angular orientation may vary through a range of 90°, in response to frequency variation of the sinusoidal input signal.

Application of an input signal comprising two or more frequency components to the common input circuit for the two networks produces on the screen of the oscilloscope a luminous area bounded by a polygon having one pair of parallel sides oriented or inclined according to each frequency component present.

For measurement of the frequency of a single-frequency input signal, the deflection circuits of the oscilloscope may be biased and a calibration scale may be provided for convenient indication over an expanded scale, similar in appearance to a galvanometer scale.

It is desirable but not necessary for the operation of the present invention that the two transmission networks present oppositely sloping output vs. frequency characteristics, such as are provided by the filter networks 11 and 21 in the illustrated embodiments. Comparison of the output strength of a variable-output network with the output strength of a constant-output network could be used for signal-frequency determination, provided that the networks are of properly regulated output phase relations.

It is clearly apparent from the foregoing description that many variations of the present invention may be made without departure from the broad principles set forth above. For example, a high-pass filter 11′ employing inductive reactance elements, as illustrated in Fig. 8, may be substituted for the resistance-capacitance high-pass filter 11; and a low-pass filter 21′ employing inductive reactance elements, as illustrated in Fig. 9, may be substituted for the resistance-capacitance low-pass filter 21.

Figure 8:
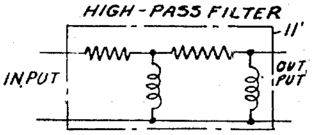
Figs. 8 and 9 are circuit diagrams illustrating resistance-inductance high-pass and low-pass filters.
Figure 9:
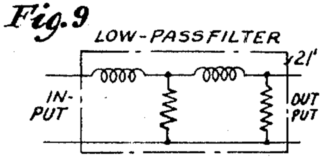

Fig 8, showing an alternative high-pass filter 11′, is illustrative of a two-section filter wherein resistance is employed as one of the types of elements, so that the 0° impedance angles of the series elements lag the 90° impedance angles of the inductive reactance shunt elements by the necessary 90°. Moreover, the impedance angles of the series elements in Fig. 8 bear the same impedance angular relation to the shunt impedance elements therein as characterizes the series and shunt impedance elements of the other high-pass filter 11 of Fig. 5. Similarly each of the two alternatively usable low-pass filters 21 and 21′ comprises series impedance elements bearing the same relation (+90°) to its shunt impedance elements as characterize the relations between the impedance angles of series and shunt elements of the other low-pass filter.

Also, for very small signals applied to the input terminals 16, amplification may be provided in a common channel prior to the input terminals of the low-pass filter 21 and the high-pass filter 11, or amplification in the separate channels may be provided for amplifying the output signals from the respective filters 11 and 21 prior to application to the cathode-ray deflection circuits.

Furthermore, known types of electric signal ratio-indicating instruments may be substituted for the cathode-ray oscilloscope 18, if desired, and such instruments may be calibrated directly in terms of frequency according to the response characteristics of filters 11 and 21.

As many changes could be made in the above construction and many apparently widely different embodiments of this invention could be made without departing from the scope thereof, it is intended that all matter contained in the above construction or shown in the accompanying drawing shall be interpreted as illustrative and not in a limiting sense.

What is claimed is:

1. Frequency responsive apparatus comprising a cathode ray oscilloscope having a first deflection circuit for a first direction and a second deflection circuit for providing deflection in a second direction perpendicular to said first direction, an input circuit for receiving an alternating input signal, a first frequency responsive network connected between said input circuit and said first deflection circuit, a second frequency responsive network connected between said input circuit and said second deflection circuit, each of said networks comprising two network sections each having a series input impedance and a shunt output impedance, the series impedances of said first network being resistive and the shunt impedances thereof being capacitive and the series impedances of said second net work being capacitive and the shunt impedances thereof being resistive, and the series and shunt impedances of each section of each of said networks being equal at a common frequency.

2. Frequency responsive apparatus comprising a cathode ray oscilloscope having a first deflection circuit for a first direction and a second deflection circuit for providing deflection in a second direction perpendicular to said first direction, an input circuit for receiving an alternating input signal, a first frequency responsive network connected between said input circuit and said first deflection circuit, a second frequency responsive network connected between said input circuit and said second deflection circuit, each of said networks comprising two network sections each having a series input impedance and a shunt output impedance, the series impedances of said first network being characterized by an impedance angle substantially 90° ahead of the impedance angle of the shunt impedances thereof, the shunt impedances of said second network being characterized by an impedance angle substantially 90° ahead of the impedance angle characterizing the series impedances thereof, and the series impedance of each section of each of said networks being equal to the shunt impedance of the section at a common predetermined frequency.

3. Frequency responsive apparatus as defined in claim 2, wherein at least one of said networks comprises resistance elements and inductance elements, one of these classes of elements being the series impedances and the other of these classes of elements being the shunt impedances.

4. Frequency responsive apparatus as defined in claim 2, further including direct-current biasing means coupled to said first and second deflection circuits for biasing the cathode ray an appreciable distance from the cathode ray tube axis in both said first and second directions to establish an eccentric pivotal point for the cathode ray pattern.

5. Frequency responsive apparatus comprising a cathode ray oscilloscope having a first deflection circuit for a first screen direction and a second deflection circuit for providing deflection in a second screen direction perpendicular to said first direction, an input circuit for receiving an alternating input signal, a first frequency responsive network connected between said input circuit and said first deflection circuit, a second frequency responsive network connected between said input circuit and said second deflection circuit, said first network comprising an even number of impedance sections each having a series impedance of a first impedance angle and a shunt impedance of an impedance angle lagging said first impedance angle by substantially 90°, said second network comprising an equal even number of sections each having a series impedance of a second impedance angle and a shunt impedance of an impedance angle leading said second impedance angle by substantially 90°, and the magnitude of the series impedance being equal to the magnitude of the shunt impedance in each section of said first and second networks at a common frequency.

EDWIN T. JAYNES.

REFERENCES CITED

The following references are of record in the file of this patent:

UNITED STATES PATENTS

| Number | Name | Date |
|---|---|---|
| 1,663,086 | Long | Mar. 20, 1928 |
| 1,711,101 | Shanck | Apr. 30, 1929 |
| 2,017,894 | Cady | Oct. 22, 1935 |
| 2,022,790 | Sturdy | Dec. 3, 1935 |
| 2,121,103 | Seeley | June 21, 1938 |
| 2,254,023 | Wright | Aug. 21, 1941 |
| 2,306,361 | Stuart | Dec. 22, 1942 |
| 2,426,721 | Adams | Sept. 2, 1947 |
| 2,434,914 | Earp | Jan. 27, 1948 |